W. B. WAIT.
Nut-Locks.

No. 138,214. Patented April 22, 1873.

Witnesses.
James L. Norris
William B. Sniffen

Inventor.
William B. Wait
By Van Santvoord & Hauff
his Attys

UNITED STATES PATENT OFFICE.

WILLIAM B. WAIT, OF NEW YORK, N. Y.

IMPROVEMENT IN NUT-LOCKS.

Specification forming part of Letters Patent No. 138,214, dated April 22, 1873; application filed February 26, 1873.

*To all whom it may concern:*

Be it known that I, WILLIAM B. WAIT, of the city, county, and State of New York, have invented a new and useful Improvement in Nuts for Bolts of Railroad-Joints, &c.; and I do hereby declare the following to be a full, clear, and exact description thereof which will enable those skilled in the art to make and use the same, reference being had to the accompanying drawing forming part of this specification, in which drawing—

Figure 1:
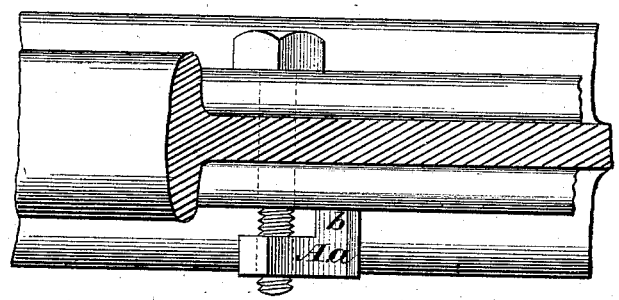
Figure 2:
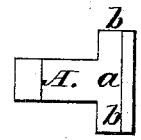

Figure 1 represents a sectional plan or top view of a railroad-joint provided with my invention. Fig. 2 is a plan view of a modification of the same.

Similar letters indicate corresponding parts.

This invention consists in a nut with an eccentric bearing-surface, which, when applied to the bolt of a railroad-joint, or to any bolt exposed to a jarring motion, is prevented by its own gravitation from turning loose, and which, by reason of its eccentric bearing-surface, acts on the bolt with a leverage, whereby the same becomes firmly wedged in its place, and all danger is avoided that such bolt may work out by the jar to which it may be exposed.

In the drawing, the letter A designates a nut, which is provided with an extension, *a*, and an eccentric bearing-surface, *b*, so that if the nut is screwed up tight the heavy side of the nut will have a tendency to turn down by its own gravity, and owing to such weighted portion and eccentric bearing-surface will act on the bolt with a certain leverage, whereby the same becomes firmly wedged in its hole, so that the jarring motion to which it may be exposed will not be able to disturb its stability, and consequently all danger is avoided that the bolt may work loose and drop out of its hole.

This invention is intended particularly for railroad-joints, in which bolts, provided with nuts of the ordinary form or construction, are liable to work loose by the jar of the passing trains, and if a bolt has worked loose the ends of the rails become separated and the trains are liable to run off the track. By my invention such accidents are effectually prevented.

In Fig. 2 I have shown a nut with an eccentric bearing-surface on each side, so that it makes no difference which way the nut is screwed on, and that by turning the nut round the eccentric bearing-surface may be brought on the correct side of the bolt. This last-named object may, however, also be attained by turning the bolt in its hole until the nut, when screwed up tight, will come in the required position, as shown in Fig. 1. If the gravitating part of the nut is on the side of the bolt opposite to that shown in these figures, the nut would be liable to unscrew, until its heavy part stands in a vertical position, and thereby the stability of the bolt would be impaired.

I do not broadly claim a nut with an opening for the bolt eccentric to the nut, and provided with a recess in the wall of the opening to relieve the nut from the upward jar of the bolt, which is intended to obviate the turning of the nut upon the bolt, as such is not my invention; but

What I claim as new, and desire to secure by Letters Patent, is—

A nut provided with the eccentric portion *a*, carrying the lateral extension *b*, arranged at right angles to the face of the nut, as and for the purpose shown and described.

WM. B. WAIT.

Witnesses:
W. HAUFF,
E. F. KASTENHUBER.